May 16, 1933.  F. W. DOUTHITT  1,909,667
EAR HOLDER FOR CORN CUTTING MACHINES

Original Filed Jan. 11, 1929   4 Sheets-Sheet 1

Inventor
Frank W. Douthitt
By his Attorneys
Merchant and Kenyon

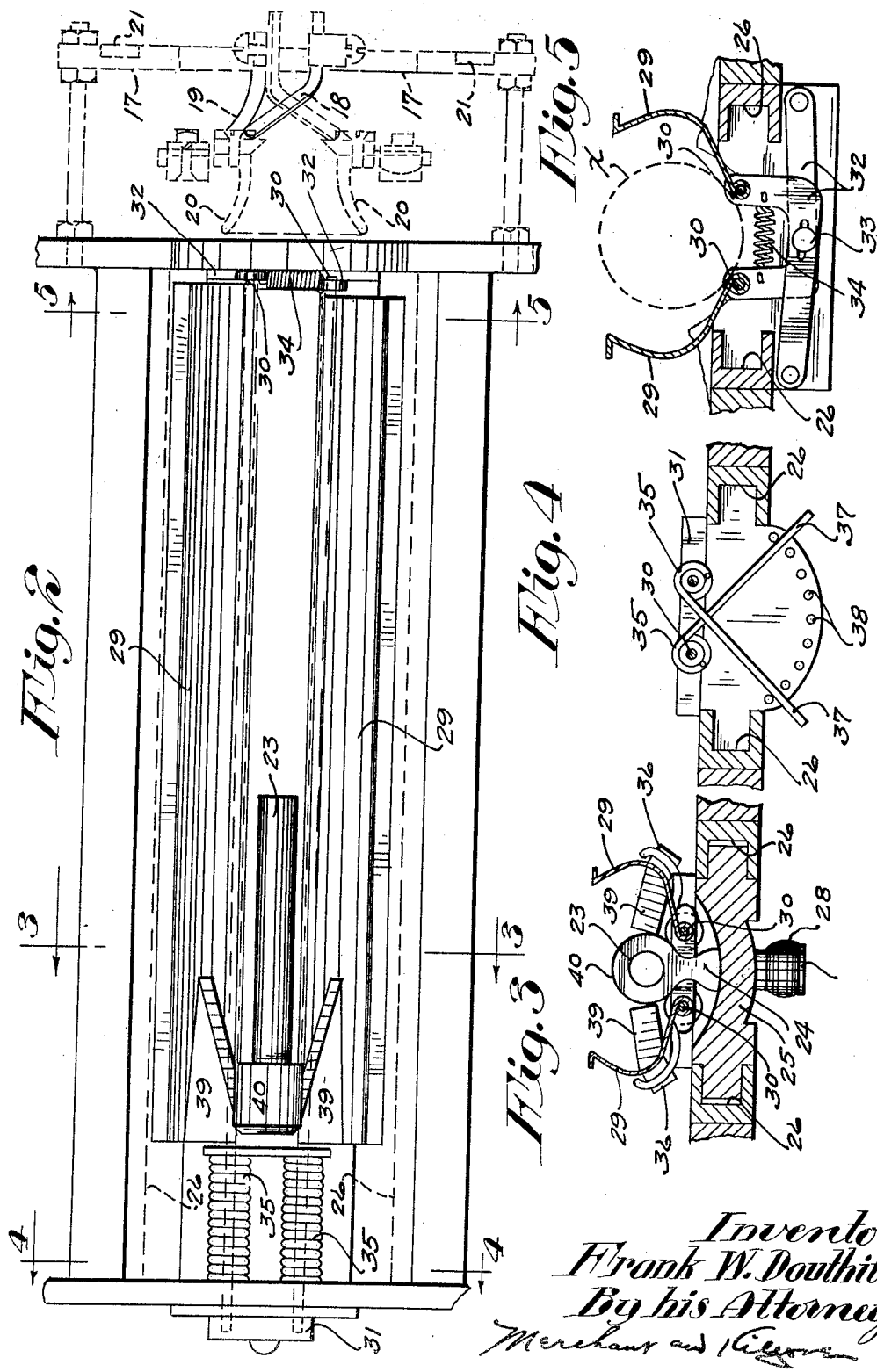

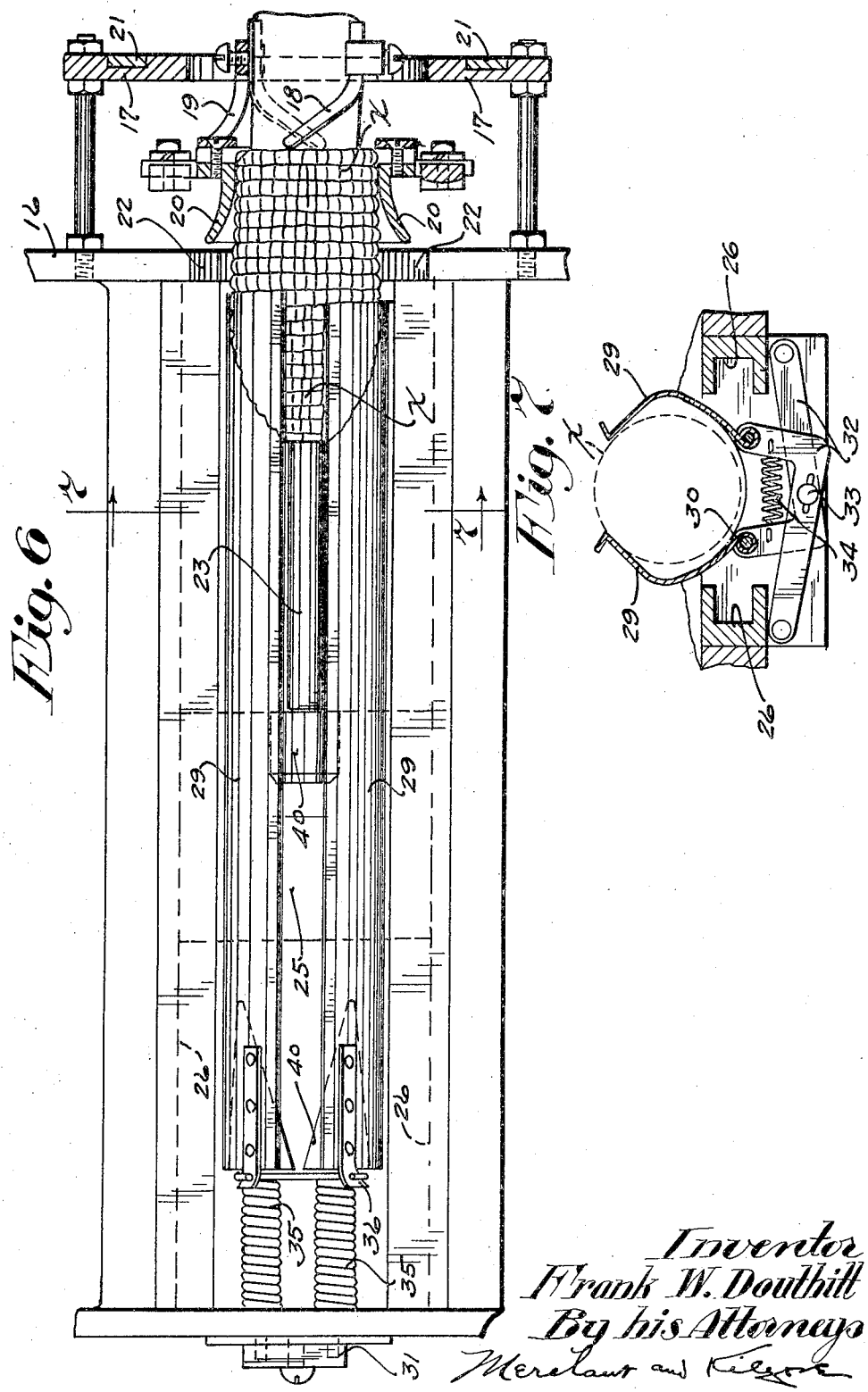

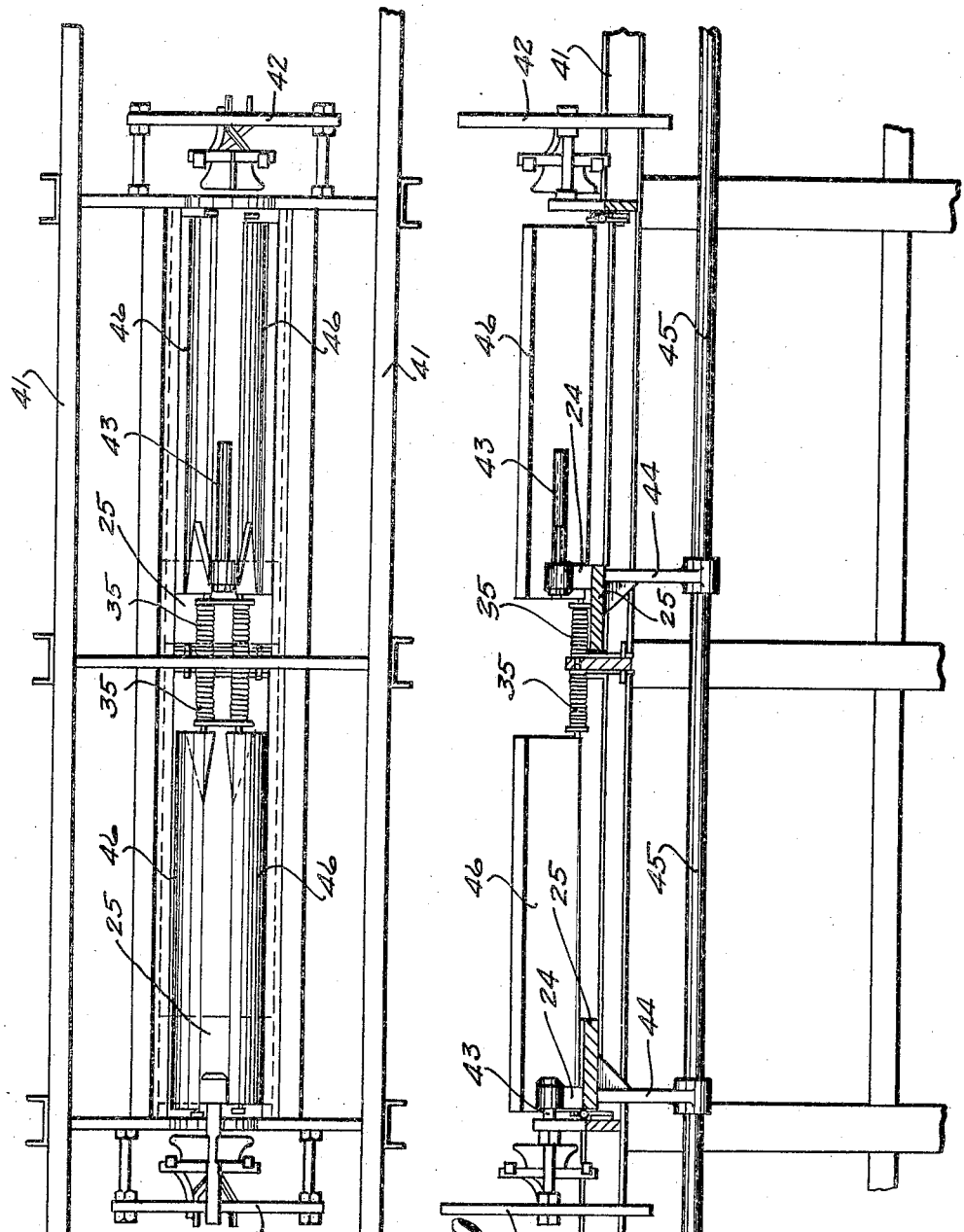

Patented May 16, 1933

1,909,667

UNITED STATES PATENT OFFICE

FRANK W. DOUTHITT, OF ORTONVILLE, MINNESOTA

EAR HOLDER FOR CORN CUTTING MACHINES

Application filed January 11, 1929, Serial No. 331,857. Renewed March 5, 1931.

My present invention relates to an improvement in corn cutting machines for use in cutting the kernels of the corn from the cobs for canning or otherwise preserving the same and more particularly the invention relates to a holder in which the ears of corn are placed one at a time and from which they are successively fed endwise to the cutter head of the machine.

The object of the invention is to provide such an ear holder that after an ear of the corn has been placed therein, said holder is self adjusting onto an ear of corn and automatic in its action to hold an ear of corn for straight line endwise feeding movement to the cutter head, and in which ears of corn of different diameters are axially aligned with the cutter head. While the invention is intended for general use in connection with corn cutting machines, it is especially well adapted for embodiment in the inventions disclosed and broadly claimed in my copending applications identified as follows, to wit:

Corn cutting machine, filed June 22, 1928 under Serial Number 288,649;

Cutter head for corn cutting machines, filed June 27, 1928 under Serial Number 288,648; and Gang corn cutting machine, filed August 9, 1928 under Serial Number 298,565.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 2 is a fragmentary plan view, on an enlarged scale, of the machine as shown in Fig. 1 with some parts diagrammatically illustrated by means of broken lines;

Fig. 3 is a detail view principally in section taken on the line 3—3 of Fig. 2;

Fig. 4 is a detail view with some parts sectioned on the line 4—4 of Fig. 3;

Fig. 5 is a fragmentary detail view principally in section taken on the line 5—5 of Fig. 2;

Fig. 6 is a view corresponding to Fig. 2 with the exception that the holder is closed onto an ear of corn which is in the process of being fed to the cutter head;

Fig. 7 is a fragmentary detail view principally in section taken on the line 7—7 of Fig. 6;

Fig. 9 is a fragmentary plan view of a gang corn cutting machine having the invention embodied therein; and Fig. 10 is a fragmentary view partly in side elevation and partly in central vertical section taken on the line 10—10 of Fig. 9.

Figure 1:
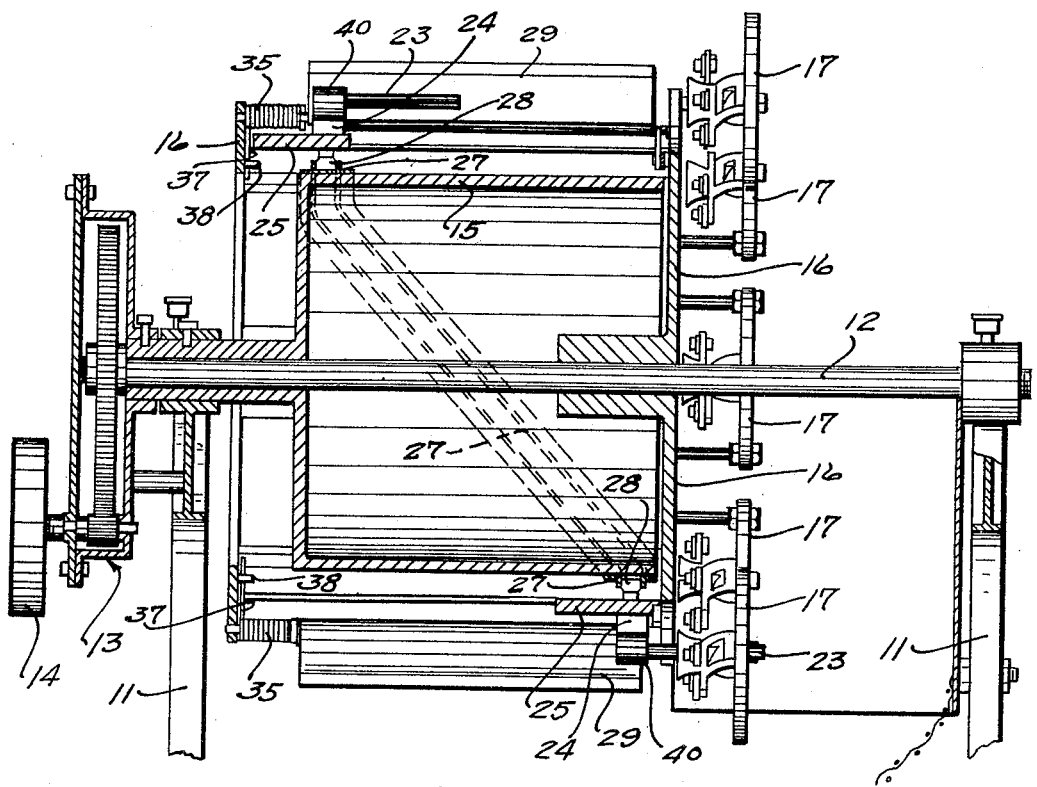
Fig. 1 is a fragmentary view partly in side elevation and partly in central vertical section showing the invention embodied in a corn cutting machine having a plurality of circumferentially spaced cutter heads mounted on a rotatable drum.
Figure 8:
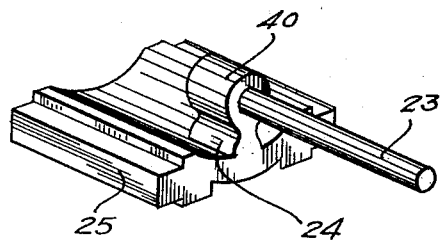
Fig. 8 is a perspective view of the cross head and plunger removed from the machine.

Referring first to the corn cutting machine as illustrated in Figs. 1 to 8, inclusive, and in which machine the invention is embodied, it is only necessary to note the rigidly connected end frames 11, horizontal driven shaft 12 journaled on said frames, driving connections 13 for said shaft including a pulley 14 over which runs a driving belt, not shown, inner and outer concentric drums 15 and 16, respectively, the former of which is stationary and the latter of which is revoluble and mounted on the shaft 12 to be rotated therewith, and cutter heads 17.

The cutter heads 17 are mounted on the outer face of the outer head of the revoluble drum 16 and circumferentially spaced equal distances apart and equal distances from the axis of said drum. Each cutter head 17 has an annular passageway and includes a plurality of cutter blades 18 circumferentially spaced about the axis of said passageway and carried on one of the ends of a plurality of levers 19 for expanding and contracting movements. On the same ends of the levers 19 with the cutter blades 18 is a sectional cylindrical depth gauge 20 that is in axial alignment with the axes of the cutter blades 18 and passageway in the cutter head 17. It may be here stated that the cutter blades 18 are of a smaller diameter than the depth gauge 20 and the difference between these diameters is the depth to which the kernels of corn are cut from the cob.

The levers 19 are intermediately fulcrumed on the cutter head 17 and their opposite ends from the cutter heads 18 are connected to a common shift ring 21 mounted on the cutter head 17 for turning movement about the axis of the passageway in said head.

A spring, not shown, yieldingly and normally holds the shift ring 21 in a position in which the levers 19 hold the cutter blades 18 and depth gauge 20 contracted to their smallest diameters. The depth gauge 20 is between the drum 16 and cutter blades 18 and has an outwardly flaring receiving end. A notch-like passageway 22 is formed in the periphery of the outer head of the revoluble drum 16 in axial alignment with the passageway in the cutter head 17.

To successively feed ears of corn X to the cutter head 17 there is provided a reciprocating plunger 23 that is axially aligned with the passageway therein. This plunger 23 extends parallel to the shaft 12 and is rigidly secured at its rear end to a short post 24 which extends radially outward from the axes of said shaft and is rigidly secured to a cross-head 25 mounted in a way 26 formed in the outer shell of the drum 16. Reciprocatory movement is imparted to the cross-head 25 and hence to the plunger 23 by a peripheral cam channel 27 on the fixed drum 15 and in which works a roller-equipped cam stud 28 on the under side of said cross-head. Obviously, under the rotation of the drum 16 the cam stud 28 is caused to travel in the cam channel 27 which is arranged to impart intermittent reciprocatory movement to the plunger 23 with a short period of rest at the limit of the return stroke of said plunger. The length of the plunger 23 is such as to feed an ear of corn X completely through the cutter head 17 and when retracted there is sufficient room to place an ear of corn X lengthwise between said cutter head and the free end of the plunger 23.

As an ear of corn X is fed endwise by the plunger 23 through the passageway 22, in the outer head of the drum 16, to the cutter head 17, the outer or small end of the ear X enters the expanded end of the depth gauge 20 expands the same to its external diameter of said ear and thereby automatically positions the cutter blades 18 to cut the kernels of corn to the desired depth. The cutter blades 18 are arranged to cut the kernels of corn from the cobs with a shearing action as the ears are fed endwise therebetween by the plunger 23. The parts thus far referred to are fully shown and described in the copending applications heretofore referred to.

Referring now in detail to the invention which relates to a holder into which the ears of corn X are placed by hand one at a time and fed endwise by the plunger 23 to the cutter head 17. This ear holder is of tubular form mounted in the drum 16 in substantially axial alignment with the plunger 23 and compresses two segmental sections 29 located on opposite sides of a radial line projected from the axis of the drum 16. The holder sections 29 at their inner longitudinal edges are rigidly secured to a pair of laterally spaced rock shafts 30 which extend substantially parallel to the shaft 12 with the post 24 extending therebetween. The shafts 30 at their inner ends are journaled in a bearing 31 on the inner head of the drum 16 and the outer ends of said shafts are journaled in the short out turned ends of a pair of bell crank levers 32. The long arms of the levers 32 are reversely extended with their inner end portions overlapped and connected by a slot and pin connection 33. The outer ends of the long arms of the levers 32 are pivoted to the outer head of the drum 16.

A coiled spring 34 connects the short arms of the levers 32 and normally hold said short arms yieldingly drawn toward each other with the respective ends of the shafts 30 in their nearest approach to each other. These crossed and yieldingly held levers 32 support the respective end of the holder for slight floating movement on a radial line projected from the axis of the drum 16 for a purpose that will presently appear. As best shown in Figs. 2 and 6, the holder terminates short of the inner head of the drum 16 and the sections 29 of said holder are normally and yieldingly held closed by a pair of coiled springs 35 with their outer or free longitudinal edges of said sections engaging each other as stops. These springs 35 encircle the shafts 30 between the holder and inner head of the drum 16 with one of their ends attached to the holder sections 29 at 36. The other ends of the springs 35 are extended to afford a pair of crossed members 37 which are adjustably anchored to the drum 16 by pins 38. These pins 38 are circumferentially spaced with the spring members 36 engaging two thereof. By moving the spring members 36 into engagement with different pairs of pins 38 the tension of the springs 35 may be varied, at will.

To automatically open the holder sections 29 to receive an ear of corn X and then release the same to the springs 35 to be closed onto said ear, there is mounted on the inner faces of said sections at the inner edge portions thereof cam lugs 39 arranged to be engaged by a cam head 40 on the upper end of the post 24.

During the final retracting movement of the plunger 23 the cam head 40 engages the cam lugs 39 and opens the holder and as previously stated the cam channel 27 at this time permits the plunger 23 to remain at rest before its forward movement is started. While the holder is thus held open and the plunger 23 is at rest, the operator drops an ear of corn X into said holder between the plunger 23 and the passageway 22 with the small end of the ear toward said passageway. At the completion of the period of rest of the plunger 23 the cam channel 27 acting on the cam stud 28 moves the cross head 25 forward and thereby brings the plunger 23 into contact with the ear of corn X. During this initial projecting movement of the plunger 23 the cam head 40 moves out of engagement with the cam lugs 39 and the springs 35 automatically close the holder onto the ear of corn therein. As the holder sections 29 close onto the ear of corn therein they automatically center the same in longitudinal alignment with the plunger 23 and securely hold the same for straight line sliding movement to the cutter head. In case an ear of corn is not quite in axial alignment with the depth gauge 20 at the time its small end enters said gauge the floating forward end portion of the holder will yield and permit ears of corn of different diameters and irregular shapes to enter the gauge 20 and be centered thereby and fed through the cutter head without binding. At the completion of the projecting movement of the plunger 23 the cam channel 27 acting on the cam stud 28 will retract the same and just before the plunger 23 completes its retracting movement the cam head 40 acting on the cam lugs 39 again open the holder for the next ear of corn.

From the above description it is evident that after an ear of corn is dropped into the holder the machine is entirely automatic in its action in holding different sized ears and in feeding the same to the cutter head.

Referring now to the gang corn cutting machine as shown in Figs. 9 and 10 heretofore referred to and in which the invention is embodied it is only necessary to note the frame 41, axially aligned cutter heads 42, axially aligned plungers 43 carried by posts 44 on an endwise movable reciprocating shaft 45 and holders 46. The parts shown in Figs. 9 and 10 are the same as shown in Figs. 1 to 8, inclusive with the exception as to their engagement and any suitable means, not shown, may be provided for reciprocating the shaft 45.

Referring again to the mounting of the holder sections 29 the levers 32 in addition to permitting a floating movement of the respective end of the holder also permits angular movements of the shafts 30 toward and from each other. These angular movements of the shafts 30 are substantially perpendicular to the floating movement of the holder and permits expanding and contracting movements of the holder section 29 independent of their opening and closing movements.

It will thus be seen that the mounting of the holder at the cutter head is such as to permit universal movements of the holder in a plane perpendicular to the movement of an ear of corn to the holder and thus permit lateral movements of the ear as the same is fed into the cutter head.

In other words, the opposed devices which grip the ear may move toward and from each other, or may be moved together in the same direction, and at the delivery end the opposed devices are capable of moving in a direction at right angles to their movement relative to each other. This enables that portion of the ear which is being operated upon by the cutting means to centralize itself in the cutting means. No matter if the ear is crooked, or the point of the ear offset to one side or the other, that portion of the ear which is contacting with the knives will be centralized in the cutting means.

What I claim is:

1. In a corn cutting machine, the combination with a cutter head, of an ear gripper and guide substantially axially aligned with the cutter head, means for feeding an ear of corn from the gripper and guide into the cutter head, the rear end of the gripper and guide being mounted in a relatively fixed bearing for slight angular movement, and a floating bearing in which the front end of the gripper and guide is mounted.

2. In a corn cutting machine, the combination with a cutter head, of an ear gripper and guide substantially axially aligned with the cutter head, means for feeding an ear of corn from the gripper and guide into the cutter head, the rear end of the gripper and guide being mounted in a relatively fixed bearing for a slight angular movement, a pair of connected levers in which the front end of the gripper and guide is mounted, and a spring normally holding said levers in one of their extreme positions.

3. In a corn cutting machine, the combination with a cutter head, of an ear gripper and guide comprising a pair of wings having at their ends front and rear pairs of trunnions, the latter of which are journaled in relatively fixed bearings with freedom for slight angular movements, and a pair of connected levers set vertically edgewise transversely of the gripper and guide, and a spring normally holding the levers in one of their extreme positions, said front pair of trunnions being journaled in the arms of said levers.

4. In a corn cutting machine, the combination with a cutter head, of a yieldingly closed cylindrical ear gripper and guide having a pair of internal diametrically opposite cams, and a reciprocatory ear feeding device in the ear gripper and guide having a cam head arranged to pass between said cams and operate the same to open the ear gripper and guide during the retracting movement of the ear feeding device.

5. In a corn cutting machine, the combination of a cutter head having an axial feed passage-way and means for receiving and directing an ear in axial alinement with the cutter-head passage-way, including opposed devices for engaging and directing the ear, means for independently and yieldingly mounting said devices to shift toward and from each other or together in a direction radially of the cutter head, and means for yieldingly supporting said mountings at the delivery end to shift in a direction substantially at right angles to the movement of said devices relative to each other so as to permit the ear to shift in any direction and that portion of the ear being operated upon by the cutting head to centralize itself in said cutting head.

6. In a corn cutting machine, the combination of cutting means having an axial feed pasageway, means for receiving and directing an ear in axial alinement with said passageway, including opposed devices for engaging and directing the ear, means for yieldingly mounting said devices to shift toward and from each other, and means for supporting said mountings to permit said devices at the delivery end to shift in a direction substantially at right angles to the movement of said devices relative to each other to permit that portion of the ear being operated upon by the cutting means to centralize itself in said cutting means.

7. In a corn cutting machine, the combination of cutting means having an axial feed passageway, means for receiving and directing an ear in axial alinement with said passageway including opposed devices for gripping and directing the ear, means for yieldingly moving said devices toward each other and into gripping contact with the ear, and means for supporting said devices so as to permit the delivery end thereof to shift in a direction substantially at right angles to the movement of the devices relative to each other to permit that portion of the ear being operated upon by the cutting means to centralize itself in said cutting means.

8. In a corn cutting machine, the combination of cutting means having axial feed passageway, means for receiving and directing an ear in axial alinement with said passageway, including opposed devices for engaging and directing the ear, means for yieldingly mounting said devices to shift toward and from each other, means for supporting said mountings to permit said devices at the delivery end to shift in a direction substantially at right angles to the movement of said devices relative to each other to permit that portion of the ear being operated upon by the cutting means to centralize itself in said cutting means, means for separating said devices to receive the ear, and a plunger movable between said devices for engaging the ear for forcing the same from said directing devices into and through the cutting means.

9. In a corn cutting machine, the combination of cutting means having an axial feed passageway, means for receiving and directing an ear in axial alinement with said passageway including opposed devices for gripping and directing the ear, means for yieldingly moving said devices toward each other and into gripping contact with the ear, means for supporting said devices so as to permit the delivery end thereof to shift in a direction substantially at right angles to the movement of the devices relative to each other to permit that portion of the ear being operated upon by the cutting means to centralize itself in said cutting means, means for separating said devices to receive the ear, and a plunger movable between said devices for engaging the ear for forcing the same from said directing devices into and through the cutting means.

In testimony whereof I affix my signature.

FRANK W. DOUTHITT.